UNITED STATES PATENT OFFICE.

PAUL HENRI JOSEPH CHAUTARD AND HENRI KESSLER, OF PARIS, FRANCE.

PROCESS OF DEVULCANIZING GUMS.

SPECIFICATION forming part of Letters Patent No. 722,944, dated March 17, 1903.

Application filed April 23, 1902. Serial No. 104,414. (No specimens.)

*To all whom it may concern:*

Be it known that we, PAUL HENRI JOSEPH CHAUTARD and HENRI KESSLER, citizens of the French Republic, and residents of Paris, France, have invented a new and useful Improved Process of Devulcanizing Gums, of which the following is a specification.

This invention relates to the art of regenerating vulcanized caoutchouc or rubber, as well as other gums—such as gutta-percha, for example.

In order to regenerate vulcanized rubber, it is necessary to practically separate therefrom the sulfur incorporated with the rubber in the vulcanizing process and which exists in the vulcanized mass in a state of combination with the gum or as simply mixed therewith.

The object of the invention is to effect the regeneration of the gum in such a manner that the latter shall be in condition for use as raw rubber or for revulcanization and also to effect this regeneration at such a cost as will effect a material economy.

In carrying out our invention we employ as a solvent for the vulcanized gum any substance which will at the same time dissolve both the caoutchouc and the sulfur. We prefer for this purpose some one of the phenols, either pure or mixed; but creosote and other solvents may be used. By operating *in vacuo* vulcanized caoutchouc may be dissolved by such a substance as that named above at a temperature not exceeding 100° centigrade. In the operation the sulfur separates partly in the condition of dissolved sulfur and partly in the condition of a component of volatile mass or soluble compounds. Owing to the low temperature at which the operation is effected, the gum is regenerated without undergoing modifications or changes of a kind to affect its commercial value. After dissolving the vulcanized rubber the solvent and the sulfur are separated from the rubber and the latter thoroughly washed. This regenerated rubber is readily soluble in benzin, while vulcanized rubber is not, and the regenerated rubber may be vulcanized anew.

By way of illustration we will describe the preferred method of carrying out our invention in practice in regenerating ordinary vulcanized rubber.

In a suitable boiler adapted for operation *in vacuo* we put one hundred kilos of vulcanized rubber reduced to bits or fragments and about five hundred kilos of ordinary commercial phenol or phenic acid. A vacuum is established in the boiler sufficient to reduce the pressure by about seventy to seventy-two centimeters. The mass is then heated to boiling, which is at a temperature of about 100° centigrade, and is at the same time mechanically agitated. The boiler is put in communication with a reflux condenser and the boiling kept up until the solution is complete. This first step in the treatment varies somewhat in duration according to the character of the waste rubber treated, the relative proportions of the solvent and waste rubber, the temperature, and the pressure in the boiler.

After the solution has been effected as above described the boiler is put in communication with an ordinary condenser and most of the phenol distilled off. Part of the sulfur will have been removed by the aspirator in the gaseous products; but there will remain in the mass a part in the form of free dissolved sulfur and in the state of sulfur compounds. This sulfur may be eliminated in the state of insoluble lead sulfid, for example, or by employing a suitable solvent or by precipitation. Whatever means may be employed, the sulfur separated from the gum will be removed. The remaining phenol is now separated from the gum. This may be effected by using a solvent of the phenol, such as alcohol, or by using a combining agent, such as soda or lye, or by both of these treatments. Finally the mass is run into a vat, where the gum is collected and thoroughly washed. This washed gum may then be used for any of the purposes for which raw rubber is commonly used.

Where other solvents than phenol are employed, the process will be substantially the same, only the temperature and pressure being somewhat modified.

The application of the above-described process to damaged gums and to crude gutta-percha yields excellent results, the product being pure and unchangeable.

It will be noted that our process for regenerating vulcanized rubber and gutta-percha consists, essentially, in desulfurizing by dissolving them in some solvent, such as phenol or creosote, which will dissolve both the sulfur and gum, this operation being performed *in vacuo* at a temperature ordinarily not exceeding 100° centigrade.

Having thus described our invention, we claim—

1. The herein-described method of regenerating vulcanized gums, which consists in dissolving the same *in vacuo* at a temperature not exceeding 100° centigrade, in phenol, then distilling off the main portion of the phenol, and then removing the separated sulfur and remaining phenol.

2. The herein-described method of regenerating vulcanized rubber, which consists in mixing the latter with phenol in about the proportions specified, then subjecting the mass to a temperature of about 100° centigrade, *in vacuo*, until the gum and sulfur are dissolved, then distilling off the main portion of the phenol, then removing the separated sulfur and phenol remaining from the mass, and then thoroughly washing the regenerated gum.

In witness whereof we have hereunto signed our names in the presence of two subscribing witnesses.

PAUL HENRI JOSEPH CHAUTARD.
HENRI KESSLER.

Witnesses:
JULES ARMENGAUD, Jeune,
EDWARD P. MACLEAN.